United States Patent [19]
Chester

[11] 4,180,897
[45] Jan. 1, 1980

[54] METHOD OF FABRICATING HONEYCOMB HEAT EXCHANGER

[76] Inventor: Dwight H. Chester, Ellisdale Rd., Allentown, N.J. 08501

[21] Appl. No.: 942,474

[22] Filed: Sep. 15, 1978

Related U.S. Application Data

[63] Continuation of Ser. No. 779,326, Mar. 21, 1977, abandoned, which is a continuation-in-part of Ser. No. 620,826, Oct. 8, 1975, abandoned.

[51] Int. Cl.$^2$ .............................................. B23P 15/26
[52] U.S. Cl. .......................... 29/157.3 A; 29/157.3 B; 29/726; 29/90 R; 156/197; 408/215
[58] Field of Search ................. 29/157.3 A, 157.3 B, 29/157.3 R, 726, 727, 432, 445, 33 G, 90 R; 228/157, 181, 183; 156/197; 408/1, 215, 217, 218

[56] References Cited

U.S. PATENT DOCUMENTS

| | | | |
|---|---|---|---|
| 451,890 | 5/1891 | Dixon | 408/215 |
| 1,342,201 | 6/1920 | Beckwith | 29/432 |
| 1,425,122 | 8/1922 | McKechnie et al. | 29/90 R |
| 1,466,953 | 9/1923 | Loomis | 29/90 R |
| 2,023,738 | 12/1935 | Mason et al. | 29/157.3 A |
| 2,057,244 | 10/1936 | Maynes | 29/157.3 B |
| 2,093,202 | 9/1937 | Maynes | 113/118 B |
| 2,173,666 | 9/1939 | Sibley | 29/157.3 AH |
| 2,325,627 | 8/1943 | Neilson | 408/215 |
| 2,659,255 | 11/1953 | Bates | 29/432 |
| 2,756,496 | 7/1956 | Holland | 156/197 |
| 2,913,806 | 11/1959 | Kritzer | 29/157.3 B |
| 3,325,890 | 6/1967 | Sandor | 29/432 |
| 3,519,510 | 7/1970 | Ardolino et al. | 156/197 |
| 3,611,549 | 10/1971 | Pope | 29/433 |
| 3,683,478 | 8/1972 | Glay | 29/157.3 B |

*Primary Examiner*—Daniel C. Crane
*Attorney, Agent, or Firm*—Arthur L. Plevy

[57] ABSTRACT

A heat exchanger comprises a general elongated rectangular member having major side surfaces of a honeycomb configuration. The member has at least one aperture extending therethrough and along the length of said member and an inner tubular member positioned in said aperture and in close thermal contact with said elongated member. Techniques are described which enable the positioning of the tube within said member.

13 Claims, 24 Drawing Figures

METHOD OF FABRICATING HONEYCOMB HEAT EXCHANGER

This is a continuation of application Ser. No. 779,326, filed Mar. 21, 1977, now abandoned, which is a continuation-in-part of application Ser. No. 620,826, filed Oct. 8, 1975, now abandoned.

BACKGROUND OF INVENTION

This invention relates to heat exchangers which basically are of the type comprising an innertube through which a fluid is circulated. The outer wall of the tube is provided with metallic fins for heat conducting elements.

Generally such heat exchangers have been utilized in a number of different environments such as baseboard heaters, automobile radiators, solar energy converters and so on.

In regard to the general apparatus to be described and depicted in this invention, there exists a great number of prior art units which essentially, define techniques and apparatus for providing heat exchanger units and similar devices.

Typical examples of such apparatus can be had by referring to certain prior art patents such as U.S. Pat. No. 2,471,582 entitled HEAT EXCHANGER APPARATUS FOR FLUIDS issued on May 31, 1949 to R. Poole. Other patents which depict similar devices are evidenced in U.S. Pat. No. 2,775,431; 2,692,763; 3,004,328; 3,433,300 and 3,467,180.

These patents basically describe heat exchanger apparatus and methods of making such apparatus to be used as briefly described above.

Mainly, the typical problem experienced by such apparatus is the insertion of the tube into the fin structure to maintain good heat transfer. Generally speaking, the finer the contact between the fin assembly and the tube, the more efficient the assembly. It has been difficult in the prior art to implement good contact and as such, many of the prior art assemblies are composite devices which include collars or coupling members to enable one to optimumly secure the fins to the tubing.

In general, the above noted patents describe the problem in conjunction with different types and configurations of heat transfer fins.

It is an object of the present invention to provide an improved heat exchanger which is relatively easy to produce and provides extreme reliability in operation.

DESCRIPTION OF PREFERRED EMBODIMENT

A heat exchanger comprises an outer metallic foil honeycomb member including a plurality of individual cells, said member having a predetermined length and formed from a plurality of stacked thin foils bonded together in a predetermined sequence, said honeycomb member having an aperture therethrough and an inner tubular member positioned in said aperture and contacted about its periphery by those edges of certain of said cells located about said aperture to provide thermal contact between said inner tube and said honeycomb member. Techniques for emplacing said tube are described which involve advancing and rotating a spin tool through an aperture in said honeycomb to enable close coupling between the honeycomb and a tube which moves according to the movement of said tool.

DETAILED DESCRIPTION OF FIGURES

Before proceeding with a description of the invention, it is indicated that the heat conducting element or the heat transfer element which serves the analgous function as a prior art fin, will be designated and referred to in the foregoing specification as a honeycomb. The term "honeycomb" is fairly widely used to describe the structure as it, in essence, has the general appearance of a honeycomb as might exist in a beehive.

In any event, the honeycomb structure is known and has been widely used, for example, in the aircraft industry to provide rigidity to aircraft structures, while maintaining light weight.

Figures 1A, 1B, 1C, 1D:
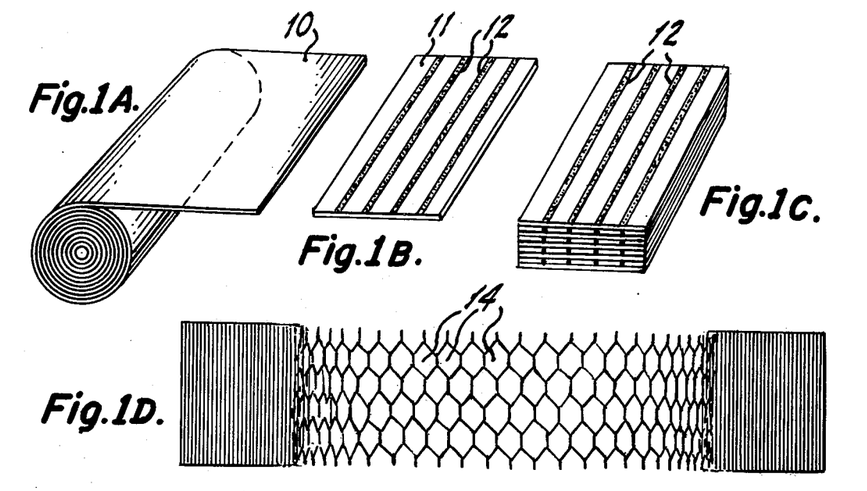
FIGS. 1A to 1D depict steps used in the formation of a metallic foil honeycomb structure.

Referring to FIG. 1, a few simplified steps in the process of fabricating a honeycomb structure are shown. It is again noted that there are many techniques for providing such a structure and such techniques are part of the prior art.

Essentially, the process begins as shown in FIG. 1A with a roll 10 of metallic foil. The foil may be comprised of any metal, although aluminum is particularly desirable due to its cost and availability. In any event, any metal which can be formed into a foil may be used, such as stainless steel, copper and so on.

As the foil roll 10 is unraveled, sheets of a predesired length such as 11 are cut from the foil. The sheets 11 may be approximately 0.003 to 0.005 inches thick. The sheet 11 in FIG. 1B is shown having a plurality of lines 12 on the surface thereof. These lines may be printed or represent an adhesive layer, such as a suitable epoxy or glue which is placed on the sheets at predetermined positions across the surface.

The sheets are then glued one above the other at the lined areas 12, as shown in FIG. 1C to form a stack. The height of the stack determines the final length of the honeycomb and may be, for example, two or more inches in height. Typical dimentions of the foil in regard to length and width, may be between two and three inches; although, the stack shown in FIG. 1C can be relatively any width and length and can be cut to a desired size prior to expansion of the same.

After the glued sheets are dried under the influence of heat and/or pressure or both, the unit is expanded as shown in FIG. 1D. The expansion operation is usually accomplished by holding one end of the stacked foil sheets fixed and expanding by exerting a force, for example, in the directions shown in FIG. 1D.

Thus, as can be ascertained from the figures, one has a long honeycomb-like structure containing a plurality of cells or apertures as 14 extending throughout.

It can thus be ascertained that the structure shown in FIG. 1D has a very high surface area as compared to for example, the unexpanded block or stack shown in FIG. 1C.

By way of example, let us assume that one forms a block as shown in FIG. 1C by utilizing one thousand foil layers glued and stacked as shown, to form a composite block, which may for example, be two inches long by three inches wide by two inches high. If such laminations were aligned edge to edge to form a single strip of material, the strip would be two thousand inches long (one thousand by two inches length) by three inches wide and approximately 0.003 to 0.005 inches thick. While, of course, the stacked foil cannot be expanded to two thousand inches, it can be expanded to a substantial length and such structure as shown in FIG. 1D can be made to be of any desired length from, for example, several inches to several feet, as will be further explained.

It is also noted that the expanded unit is light in weight, while possessing a very large surface area for radiating or transferring heat.

The resultant honeycomb structure as shown in FIG. 1D has an extremely large surface area, and is very light in weight due to the fact that the stack (FIG. 1C) comprises a plurality of metallic foil sheets. The adhesive programming as shown in FIG. 1B is a controlled process and bonding using an epoxy or other glue is implemented under controlled pressure and heat. The amount of adhesive applied along the bonding lines 12 is small and hence, does not affect heat transfer in any substantial manner. While the prior art utilizes epoxy and so on, it can be envisioned that a metallic adhesive such as a fine solder or a metallic impregnated epoxy could be used as well; if desired.

Figure 2A:
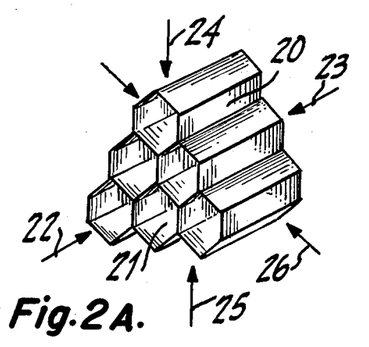
FIG. 2A is a prespective plan view of a cross section of the honeycomb configuration.
Figure 2B:
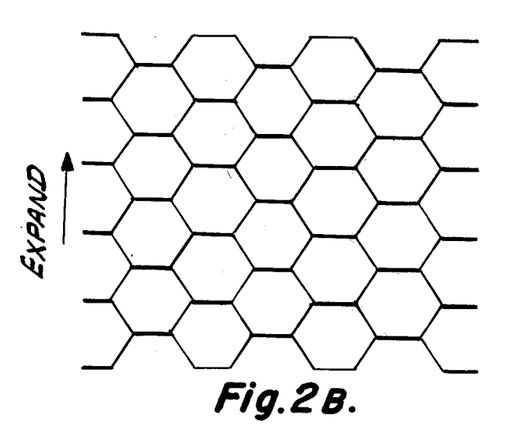
FIG. 2B is a side view of a bonded honeycomb.

Referring to FIG. 2, there is shown a perspective view of a section of honeycomb 20. As indicated, the expanded member has a series of six sided polygons or cells 21. Each wall of the cell 20 may be of the order of about two to six millimeters long, depending upon the adhesive program. The height of the honeycomb which can vary, may be between three to ten millimeters or more; depending again on design, while the width may be within the same dimensions as the height. The length of the expanded member can vary according to the number of laminations and can be several feet or more. The bond lines are shown in FIG. 2B.

Essentially, the dimensions are not critical and can serve a plurality of applications.

The honeycomb 20 as indicated, is light in weight and possesses great strength, due to the cellular structure. The strength of the unit 20 approaches that of a solid metal block for forces applied in the direction of arrows 22 and 23. The strength is also quite high in the direction of arrows 24 and 25. The unit 20, after expansion, behaves as an "accordian" in directions parallel to its length (arrow 26) and will tend to compress for forces applied in those directions indicated by arrow 26.

As indicated above, honeycomb structures have been used in the aerospace industry to provide additional support to wing structures and so on, due to its strength and due to the fact that it is light in weight and as such, the honeycomb as shown and techniques for gluing or bonding the foil sheets and the subsequent expansion of the resultant structure, are also known and implemented in the prior art.

As will be described, the object and intent of this particular invention is to use the honeycomb in combination with a pipe to provide a composite heat exchanger.

Figure 3A:
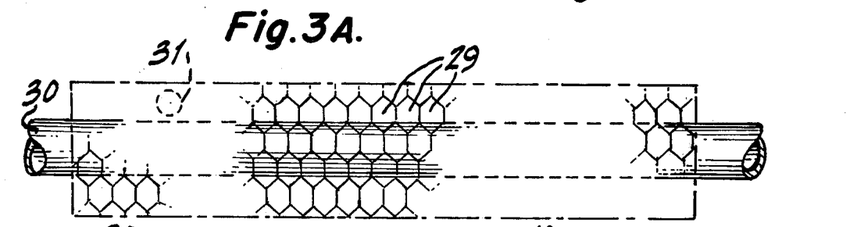
FIG. 3A depicts a side view of a honeycomb heat transfer apparatus according to this invention.

Referring to FIG. 3A, there is shown a honeycomb member 29 having a tube 30 inserted therethrough. The walls of the cells forming the honeycomb contact the peripheral surface of the tube in a multiplicity of contact points, thus providing excellent thermal contact. The tube 30 which is a metallic tube and fabricated from a good heat conductor and a ductile material such as copper, is positioned relatively at the center of the honeycomb member 29, as more clearly shown in FIG. 3B.

Figure 3B:
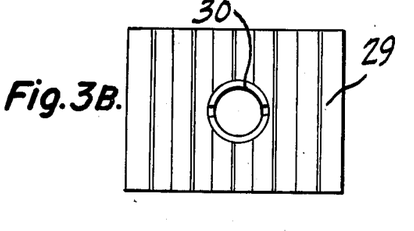
FIG. 3B is a side view of FIG. 3A.

The utility and advantages of the structure shown in FIG. 3 should be readily apparent. In any event, if a heated fluid circulated in the inner tube 30, the heat would be thermally radiated most efficiently by the foil honeycomb 29, which in essence behaves as an infinite member of radiating fins. Due to the structure of the honeycomb, each cell acts as a wind tunnel and the heated air is forced from the cells with a given velocity to provide efficient circulation to the surrounding environment. The fluid, if a refrigerant, would cool the honeycomb and provide cooling or air conditioning if used as a radiator in a baseboard or other heating system.

Another application of the apparatus would be in a solar system, wherein a solar panel would consist of a plurality of such honeycomb units placed side by side with the cells' surface facing the sun or other source of radiation. The inner tube 30 carries a fluid or water, to be heated and thence, stored in a reservoir or otherwise.

For example, if one placed six honeycomb structures side by side and each was formed as above (by a two by two by three inch foil stack), one would have an effective area of approximately six feet by forty-eight feet in a relatively small space. With the honeycomb edges facing the sun, then the cell walls and structure present a plurality of absorbing edges and the solar energy is quickly absorbed and efficiently transmitted to the inner tube 30. This results from the good thermal connection between the honeycomb 29 and the tube 30 affording thousands of contacts over the entire length of the structure. The unique surface area of the honeycomb allows absorbtion of the sun's rays relatively independent of the angle of incidence due to the thousands of cells and edges.

The unit can contain thermostats or similar heat or cold responding devices, which can be inserted in a cell and hence, monitor the temperature of the unit. Such a thermostat or temperature responsive device would be protected as it is completely enclosed within a cell of the honeycomb, as for example, element 31 of FIG. 3A.

In any event, the problem of placing a tube as 30 within an aperture formed in a honeycomb member 29 is a substantial problem.

As indicated, the edges of the cells are extremely thin (0.003 to 0.005 inches). The honeycomb, when expanded acts as a spring and does not lend itself to machining or conventional processes, due to many factors such as "memory" or hysteresis of the unit. This is evidenced in the fact that the unit, unless restrained, tends to revert back to the unexpanded state creating a plurality of multidirectional forces due to the cellular structure which adversely effects the positioning and operation of drills, and other conventional machine devices.

It is further understood that the process of inserting a tube such as 30 should be economical and relatively rapid to enable reliable and efficient production of the apparatus.

A method of providing such apparatus will be described in conjunction with FIGS. 4.

Figure 4A:
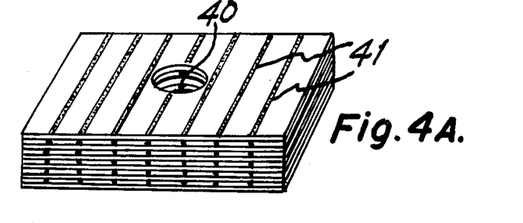
FIGS. 4A to 4E depict steps utilized in the manufacture of a heat exchanger according to this invention.

The technique depicted in FIG. 1 can be implemented and the unexpanded foil block of FIG. 1C can be drilled or stamped after the sheets are bonded together as shown in FIG. 4A, where a central aperture 40 of a given dimension is located in the metallic foil block 41.

While a single central aperture 40 is shown, it is understood that the aperture 40 can be formed off center; if desired or a number of apertures can be drilled or stamped. The block 41 is held under a hydraulic press to assure the glued foil sheets are sufficiently compressed to enable a rapid unobstructed drilling operation.

Figures 4B, 4C, 4D, 4E, 5, 6:
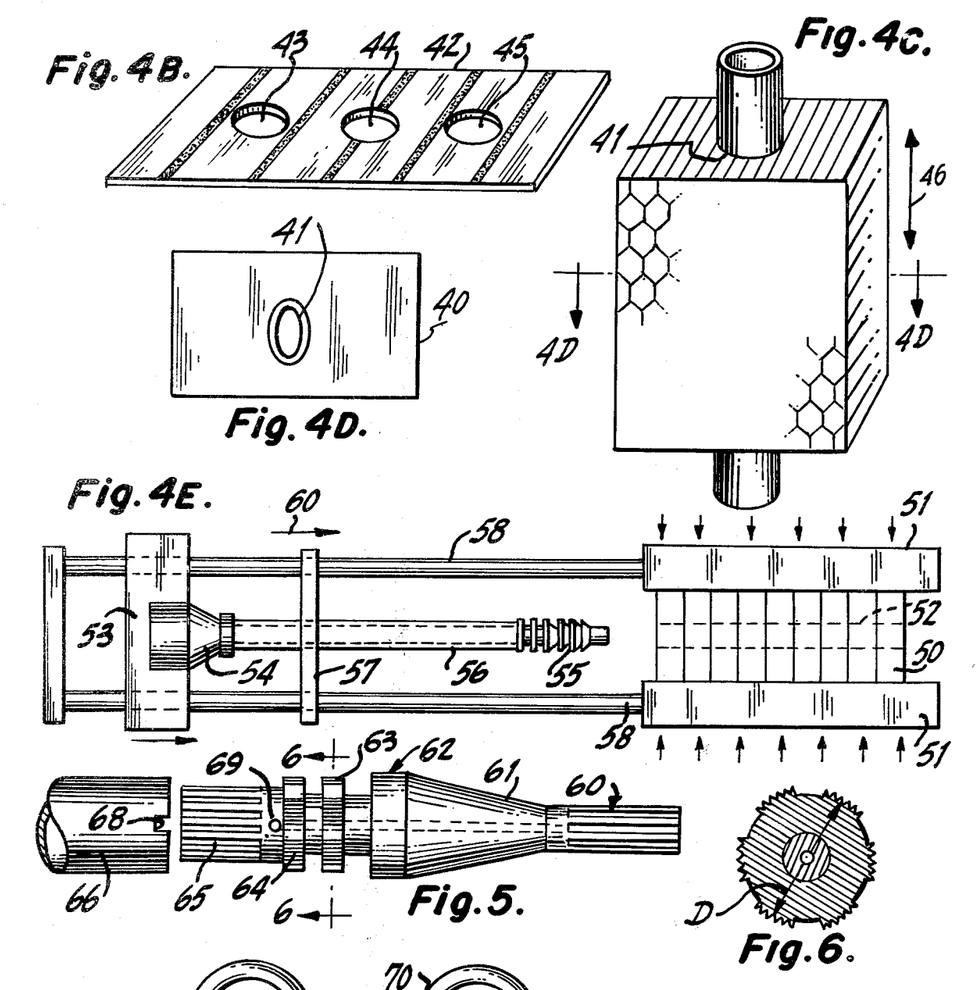
FIG. 5 is a side view of a spinning tool used in this invention.
FIG. 6 is a cross sectional view taken through line 6—6 of FIG. 5.

FIG. 4B shows an alternate technique wherein the foil sheets as 42 are prestamped along their length with suitable apertures as 43, 44 and 45. The foil sheets are then marked, stacked and glued together wherein a block as 41 of FIG. 4A is provided with apertures as 43 to 45 preformed in the foil sheets. This eliminates the drilling and allows an easy stamping process due to the thin foil, with a compound die to thereby enable any configuration of aperture to be stamped therein.

The block 41 is then expanded about a mandril or shaft 42 by pulling the same in the directions of arrow 45 to a desired length, thus creating the expanded honeycomb.

Due to the expansion process, the aperture 41 contracts and after expansion, is elliptical in shape. For example, the aperture 41 may originally be circular with a 0.625 inch diameter. After expansion, the aperture is elliptical, the vertical dimension remains at 0.625, while the major horizontal axis contracts to 0.468 inches. (FIG. 4D).

Hence, a first problem is presented as copper or inner tubes as 30 are available as off the shelf items with circular diameters. Furthermore, a tube could not be simply inserted therein since the length of the expanded honeycomb may be several feet. If a smaller diameter tube were used, it would not make good thermal contact.

Referring to FIG. 4E, there is shown a tube inserting apparatus.

The expanded honeycomb structure 50 is placed in a vise or clamp 51 and is held in a fixed position relatively securely. The aperture 52 is shown in dashed lines.

In practice, the clamping members of device 51 may be fabricated from wood and can be quite long. Pressue may be exerted on the honeycomb surfaces, which as indicated, are extremely strong.

The vise or clamping member 51 holds the honeycomb structure in a relatively rigid position. Located beneath the clamping member are two rails 58. A moveable carriage 53 is mounted on the rails and contains a motor for driving a rotating chuck 54.

The apparatus thusfar depicted is similar to a lathe. A special tool 55 is driven by a rotating chuck 54 and is coupled to the rotating chuck by a desired length of copper tubing 56 to be inserted in the channel or aperture 52 of the honeycomb.

Depending upon the length of the copper tubing 56, a series of guides or clamps as 57 may be directed between the rails 58 and serve to align the copper tube 56 and the spinning tool 55 so that it can enter and penetrate the aperture 52. As indicated, the carriage 53 moves in the direction shown by the arrow 60 while the chuck is rotated at the same time.

The tool 55, as will be explained, is coupled to the opening in the copper tube 56 by means of a slot and key arrangement or by a conventional force-fitting technique.

The other end of the copper tube 56 is clamped to the jaw 54 by relatively standard techniques.

It is thus seen that the entire copper tube with the spinning tool 55 is rotated and moved.

The spinning tool 55, due to its configuration, operates to progressively form the elliptical aperture 52 to a circular shape. The tool 55 as is progressing through the aperture 52 in the honeycomb, drags the copper tubing through the honeycomb. The spinning tool 55 has cutting edges and is tapered so that it may burnish and bore as it is rotated. As the tool proceeds through the aperture 52, the copper tubing follows the same.

As indicated, due to the plurality of cells in the honeycomb and the great number of thin edges, a completely random peripheral pattern will be developed by the tool about the aperture 52; thus forming many crags and surface edges which will contact the copper tube 56. After the tube has been inserted, there is a tendency by the expanded honeycomb, to attempt to compress. This inherent characteristic or memory of the honeycomb assures intimate contact with the copper tube as inserted.

To assure further thermal contact, the periphery of the pipe in contact with the honeycomb may be metal by using a hot metallic spray technique which can be easily implemented through the many apertures formed by the cells.

Referring to FIG. 5, there is shown a side view of a typical spinning tool as 55 of FIG. 4E. The tool has a front or pilot portion 60 which essentially, is of a diameter approximately equal to the contracted diameter of the aperture 52.

In the above example, the diameter of the pilot portion would be approximately 0.5 inches for a 0.625 inch aperture 52. The length of the section 60 may be approximately one and one-half inches or more and the surface is fluted to provide a guiding action for the tool during rotation of the same.

A tapered section 61 follows and may be approximately one inch long and a typical example would have a gradual varying taper which may be approximately at a three degree slope. The tapered portion terminates in a flat section 62 which is of a diameter slightly less than the outer diameter of the copper tube and for example, for a 0.625 inches copper tube, the diameter of section 62 may be 0.615 inches.

Two cutting members 63 and 64 are shown coaxial with the sections 60 through 62 of the tool. The member 63 has an outer diameter approximately equal to the outer diameter of the copper tube, while the member 64 is slightly larger. The typical diameter of member 63 may be about 0.625 inches, while that of 64 may be 0.630 inches.

An end portion 65 is shown which has an outer diameter slightly greater than the inner diameter of the copper tube and the copper tube as 66 is force-fit and securely held by the tube accommodating portion 65 of the tool.

There are, of course, many techniques for securing the tube 66 to a tool, as shown. One may form a slot as 68 in the copper tube and the slot may coact with a pin as 69 on the tool to assure that the tube is tightly coupled to the tool during rotation.

FIG. 6 shows a typical configuration of the sizing or cutting members 63 and 64. Basically, each member has a series of cutting edges as shown, which serve to progressively shape and dimension the aperture 52 as the tool moves through the honeycomb.

When the tool is driven though the aperture 52, it may be removed and used again to place another tube through another honeycomb structure.

As indicated above, if better thermal contact is desired, one can further metallize the periphery of the tube after the honeycomb is inserted by using a metallic spray or deposition technique.

In any event, the thermal contact between the honeycomb structure and the tube is excellent due to the fact that the thin edges of the foil material, as further formed and processed by the tool, create literally thousands of contact points about the periphery of the tube. The contact is further enhanced due to the nature of the honeycomb elements, which tend to compress slightly, thus firmly encircling the tube after insertion of the same.

In summation, there has been described apparatus which results in a reliable and efficient heat exchange assembly having a great surface area for both absorbing and transmitting heat from or to a fluid which may be circulated through the metallic tube.

It will, of course, be understood from the above description that the tube may not be hollow and one could as easily insert solid tubes using the above described techniques. While certain dimensions were specified in the specification, it is also understood that virtually any size of aperture as well as tube, can be employed as well as a plurality of such tubes for carrying different fluids using a common honeycomb radiating section.

One may further ascertain by investigating the structure shown in FIG. 3A, that the units having a great number of thin wall cells can be used in building structures, as solar energy collectors. In this application, one may utilize an array of such assemblies as a sky light, allowing sunlight to enter the enclosure, while further collecting heat.

Figure 7:
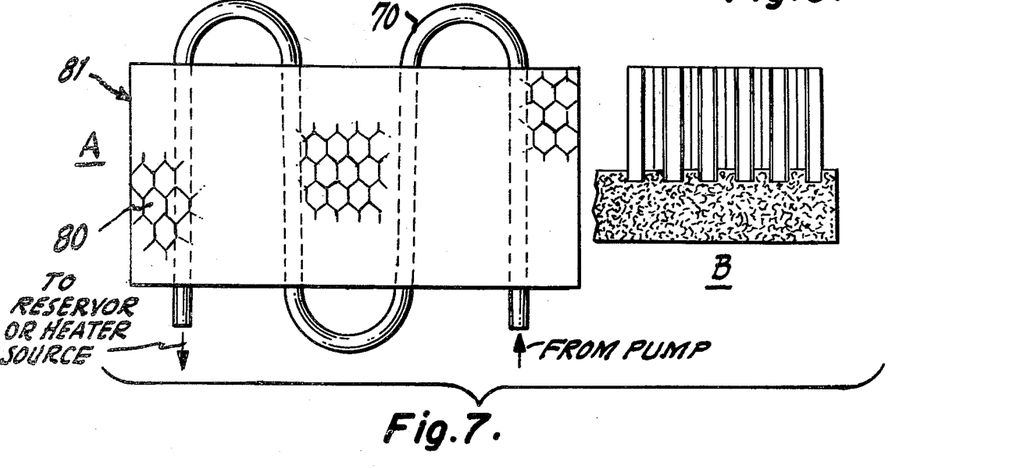
FIG. 7 is a perspective and side view of a honeycomb exchanger positioned on a porous plastic base member.

Another application for the unit is shown in FIG. 7, whereby a plurality of such units as in FIG. 3A, are stacked side by side to form a solar panel.

The internal tubes of each unit may be coupled together by means of connecting tubes as 70. The entire unit can be placed on a plastic foam base 80 by merely forcing the cell members into the soft polyfoam surface. This is accomplished by a press fit and each exchanger is held securely in place due to the fact that the thin edges of foil are pressed into the plastic. The surface of the plastic may be treated with a metallic paint 81 or another good reflecting material to further assure that energy, such as sunlight, is not absorbed to any degree by the surface of the plastic base mounting member 80. The plastic base may be made from a material such as styrofoam.

Based on the above described method, it is clearly seen that the spinning tool enables one to emplace the copper tubing and that the contact between the tube and the honeycomb is afforded by a plurality of ragged edges formed by the foil material of the cells to therefore assure thousands of contact points between the periphery of the tube and those edges of the cells located about the periphery of the processed aperture.

A great advantage in the combination resides in the fact that the manufacturer can supply and store tremendous lengths of radiator elements in very small spaces. For example, once the stacked foil block as in FIG. 1C, is formed, this block can be stored and shipped in the unexpanded condition and can be expanded at a job site by the user. It can be expanded by hand or by the use of a mandril, as shown. This is so as the expansion process is simple to implement. The distributor or user can be supplied with the apparatus as shown in FIG. 4E and thus, insert a presized copper tubing into the expanded honeycomb. As is well known, in conventional baseboard heater apparatus, the manufacture usually supplies the entire heat exchanger, which may be twelve feet long or more and two or three inches wide, to the distributor. Such units take up a great deal of warehouse and shipping space and so on.

As above indicated, there are techniques which are known in the art which can serve to couple copper tubing to the spinning tool. While the above described apparatus showed an example of a key and slot or pin and slot technique, it is also understood that the spinning tool 55 may be threaded as would be the internal diameter of the copper pipe to enable one to screw the copper pipe to the threaded surface of the spinning tool 55.

Figure 8:
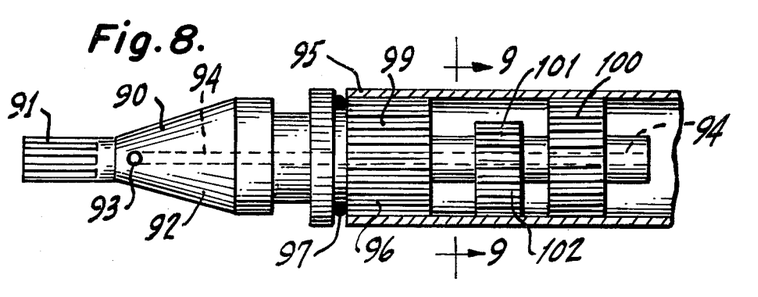
FIG. 8 is a side view of another type of spinning tool and locking mechanism which can be employed according to this invention.

Referring to FIG. 8, there is shown still a further embodiment of a spinning tool which can be employed in the invention. The spinning tool 90 is shown in a side perspective view and has a front or pilot section 91 which is essentially of a relatively fixed diameter and extends into a tapered diameter section or portion 92. The particular surface of this tool may be smooth or may contain pilot guides or flutes as previously shown in conjunction with the tool as 55 of FIG. 4.

In any event, due to the rapid rotation of the tool and the relatively long length of travel, the tool 90 of FIG. 8 includes an oil port 93. The port 93 communicates with an internal passage 94 and a cooling fluid such as an oil or a lubricant may be introduced therein.

The lubricant would serve to reduce friction and provide cooling when the spinning tool is rotated and moved through the eliptical aperture formed in the honeycomb.

The particular tool 90 of FIG. 8 may have a cutting surface 93 which would be similar in surface configuration to those cutting surfaces as 63 and 64 of FIG. 5.

The copper tube 95 is shown coupled to an end portion 96 of the spinning tool. Located about the surface of the spinning tool and the copper tubing is an O ring 97 which sits in a groove in the spinning tool and serves to prevent oil or the cooling fluid from escaping about the juncture of the tube 95 and the spinning tool.

A series of knurled surfaces such as 99 and 100 are also located on the end portion of the spinning tool 90 and serve to provide a frictional surface area to maintain the copper tube 95 in contact with the spinning tool 90 during rotation of the same.

There is also shown coupled to a reduced diameter portion of the spinning tool, an eccentric cam or bushing 101. This bushing may have a knurled or scored surface 102.

As indicated, the tool is rotated togehter with the copper tubing and is drawn through the eliptical aperture in the honeycomb.

Figure 9:
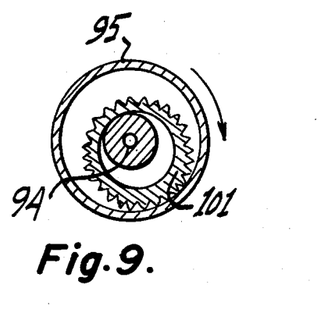
FIG. 9 is a cross sectional view taken through line 9—9 of FIG. 8.

Referring to FIG. 9, during rotation of the apparatus, the eccentric bushing 101, due to centrifugal forces, would tend to rotate off axis depending upon the eccentricity of the bushing 101 from its center line.

This rotation will cause the side surface of the bushing to firmly engage the inside surface of the copper tube 95 and hence, provide a secure and reliable locking mechanism. When the rotation is ceased, a slight twist of the spinning tool in the direction opposite of the rotation which can be either clockwise or counterclockwise, will then cause the spinning tool to be immediately released due to the functioning of the eccentric bushing 101.

It can be seen from the above description, that the function of the spinning tool is to drag the copper tube and during rotation the spinning tool serves to shape the eliptical aperture in the honeycomb to a relatively circular aperture.

Figure 10:
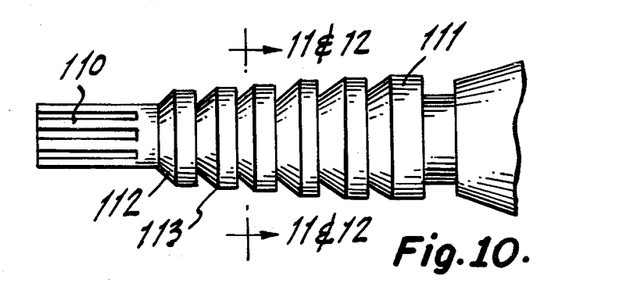
FIG. 10 is a partial side view of still another cutting tool having a particular surface configuration.

FIG. 10 shows another configuration for a spinning tool which could be employed as alternatives.

Figures 11, 12, 13:
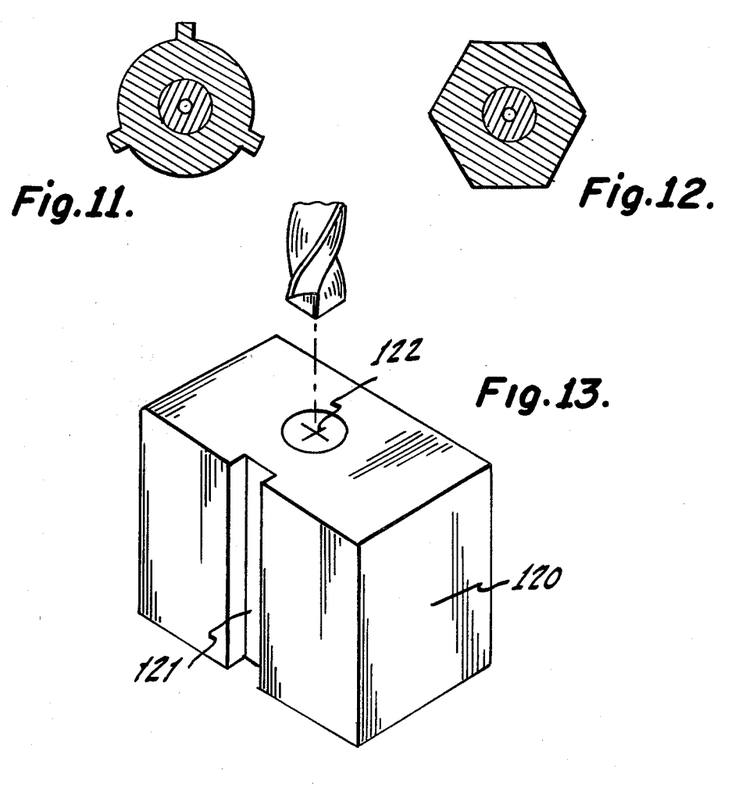
FIGS. 11 and 12 are cross sectional views taken through line A—A of FIG. 10 to show three point contact surfaces for a spinning tool which may be employed in this invention.
FIG. 13 is a perspective plan view of a stack of bonded foil incorporating a longitudinal slot used in the formation of the honeycomb structure.

In this particular spinning tool, the front portion 110 is relatively smooth and is coupled to a tapered portion 111, which in essence, provides a three point contact as shown for example, in the cross sectional views in FIGS. 11 and 12.

The three point contact assures that the spinning tool will act upon the eliptical hole in the honeycomb to produce a circular aperture.

There are many techniques for providing such contacts as shown in FIGS. 11 and 12 and may comprise a series of suitably shaped flats and slots as 112 and 113 of FIG. 10 to provide effective cross sections as shown in FIGS. 11 and 12.

Figures 14, 15:
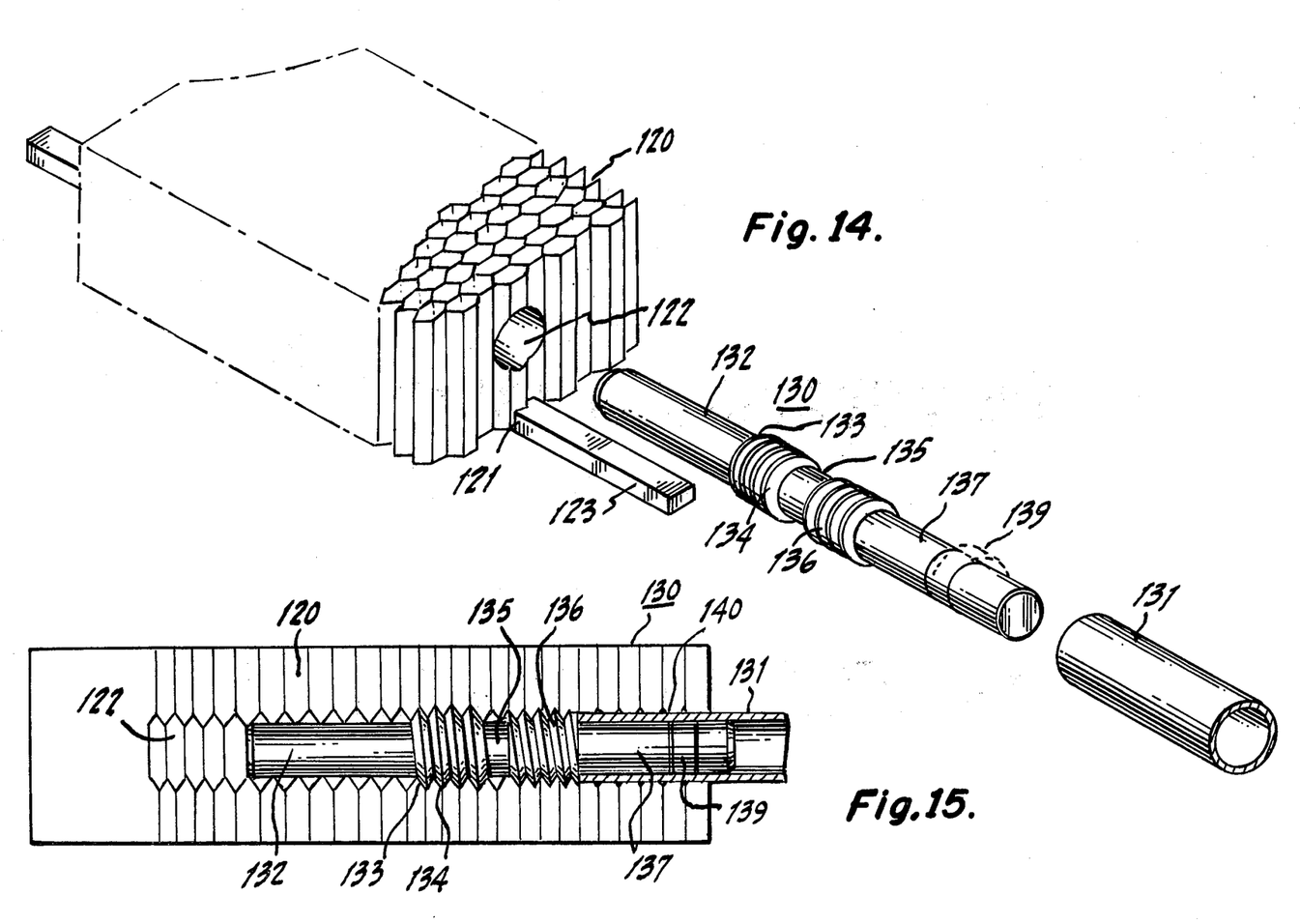
FIG. 14 is a perspective view of an expanded honeycomb structure depicting another type of spinning tool according to the invention.
FIG. 15 is a side view partly in cross-section of the spinning tool of FIG. 14 advancing through an aperture in the expanded honeycomb structure.

FIGS. 13, 14 and 15 constitute new matter and the following part of this specification constitutes new matter filed with this continuation-in-part application.

Referring to FIG. 13, there is shown a honeycomb foil stack 120. The stack is fabricated in the same manner as shown in FIGS. 1A through 1D and as indicated, is formed by gluing together foil pieces at predetermined lines.

In any event, the stack of foil sheets 120, while in its compressed state, may have a keyway 121 machined into the honeycomb. This keyway provides a longitudinal slot which is essentially parallel to the main axis of the central aperture.

As was previously explained, the central aperture 122 which is similar to aperture 40, may be predrilled while the honeycomb block 120 is in its compressed state or the holes may be stamped prior to bonding the foils together.

In a similar manner, the keyway 121 may be machined in the honeycomb block 120 when the same is in its compressed state or a notch may be stamped in every sheet prior to the bonding.

As indicated above, one way of expanding the honeycomb can be implemented along a mandril which would be inserted in the central aperture 122. The function of the keyway 121 as will be explained, is to allow one to expand the honeycomb while further assuring that there is no twisting or bending of the same during expansion. This is a preferable method of expanding the honeycomb to enable one to achieve greater lengths with more accurate alignment of the central aperture 122.

It is also noted that during any kind of expansion of the honeycomb, the central aperture 122 becomes elliptical in shape as particularly pointed out in FIG. 4D. Thus, the effect of expansion of the honeycomb in distorting the aperture configuration, cannot be avoided during the expansion process.

Referring to FIG. 14, there is shown the expanded honeycomb block 120. The keyway 121 is shown resting on a rail member 123. The rail member has a cross-sectional configuration approximately congruent with the shape of the keyway machined in the honeycomb stack 120. The rail member 123 is secured to the surface of a worktable or other elongated member as a board, and so on, and it is prealigned and machined to determine linear accuracy.

The keyway 121 of the honeycomb stack is then inserted over the rail 123. The entire assembly is thus expanded while assuring that the keyway of the foil stack is in alignment with the guide rail 123. Thus, there is no reliance on a mandril, while rail 123 assures linear expansion of the honeycomb member and hence, assures that the central aperture 122 will remain in alignment from one end to the other and there will be no twisting or turning of the honeycomb.

The entire assembly is then placed in the mechanism as the fixture shown in FIG. 4E and is ready to receive a spinning tool which serves to drag the pipe or tubing through the aperture 122.

Shown in FIG. 14 is still another type of spinning tool 130. The spinning tool 130 will be referred to as a chipless tap tool. In any event, the tool 130 operates similarly to those tools previously described, but possesses certain advantages over the units described above. The tool 130 operates to thread the honeycomb about the central aperture 122 while further pulling the metallic tube 131 through the honeycomb.

The tool 130 has a front pilot section 132 which essentially, is of a diameter approximately equal to the contracted diameter of the aperture 122. For example, the diameter of the pilot section 132 would be approximately 0.5" for a 0.562" aperture 122. The length of the pilot section 132 may be 0.75" to 1.5" or more. Essentially, the pilot section acts as a guide for the tool 130.

Following section 132 is a small tapered section 133 followed by a sharp threaded section 134. The tapered section 133 and section 134 operate to assure that the metallic tube is pulled through, during spinning of the tool, the honeycomb.

Following the sharp threaded seciton 134 is a small relief or smooth section 135. Section 135 is slightly undercut as can be seen. Following section 135 is a second tapered section 136. The tapered section 136 is threaded and terminates in a flat threaded portion of the same pitch as section 134. The flat threaded portion of section 136 flattens the honeycomb foil as it rotates to assure a good thermal bond with the metallic tube 131.

The flattened threaded portion 136 is followed by a flat knurled section 137, which terminates in an eccentric cam drive mechanism 139 similar to the structure depicted in FIG. 8, for example. This drive section 139 will maintain friction contact with the metallic tube 131 to allow the spinning of the entire assembly through the honeycomb foil member.

Referring to FIG. 15, there is shown a side elevational view of the chipless tap tool 130 progressing through the honeycomb member 120. As can be seen, the tool 130 threads its way through the honeycomb foil and flattens the foil by the action of section 136 at the area 140 to form a good thermal bond between the honeycomb member 120 and the metallic tube 131. The threading of the metallic tube to the honeycomb forms a thread shaped interconnecting pocket around the tube which permits a continuous passage of air through the foil along the metal tube 131.

A typical chipless tap tool 130 was approximately 4 1/16" long. The front pilot section 132 as indicated, is approximately 1½41 long with a diameter approximately equal to the contracted diameter of the aperture 122 in the honeycomb foil after expansion. Sections 133 and 134 were approximately ¾" in length, with section 133 (the tapered section) being about 3/16 of an inch. Section 134 is a sharp threaded section having 0.687" outer diameter threads. As seen, the tapered section 133 is at a thirty degree angle with the horizontal. The section 135 is approximately 0.5" in diameter and 3/16" in length. This is followed by section 136 which is approximately ½" in length. Section 136 has a different thread configuration than section 134, but is of the same pitch with the threads at the same angle. The tapering portion of section 136 is also at thirty degrees. The remainder of the unit comprises the knurled coupling section. The thread comprising section 136 is of an outer diameter of approximately 0.585" and is about eight threads per inch. As indicated, the threads in section 134 have an outer diameter of 0.687" and comprise approximately eight threads per inch. This particular tool operates similarly to ones described above as it also is spun and drags a metallic tube through the honeycomb.

In any event, this particular tool serves to flatten the foil edges via section 136 to afford better thermal contact between the tube 131 and the honeycomb structure. As indicated, the particular apparatus can be utilized as baseboard heat exchangers. The honeycomb pockets or cells of the honeycomb provide a wind tunnel effect to allow hot air to rise rapidly due to the cross-sectional size of each cell and the multiplicity of cells employed.

Thus, the above noted apparatus described in conjunction with FIGS. 13–15 shows an extremely efficient way of expanding the honeycomb by the use of a machined keyway and a guide rail, while further depicting a chipless tap tool which can be employed to spin and pull a metal tube through the elliptical tube accommodating aperture present in the expanded honeycomb.

To further understand the nature of the keyway 121 and its function, the honeycomb would be expanded with the notch coacting with the keyway. Since the keyway is parallel to the main axis of the aperture, the expansion of the honeycomb member will assure that the apertures in each foil or the aperture drilled through the entire block is coaxial. The expanded honeycomb structure would be placed in the fixture by exerting a pressure by a moveable vice member on the top of the honeycomb with the board or channel guide consitituting the other member of the honeycomb vise fixture.

Thus, during the spinning operation whereby the tool 130 is bored through the aperture, the keyway 121 and the rail member 123 prevent relative movement of the expanded honeycomb structure when emplaced in the fixture or jig assembly depicted as indicated, in FIG. 4E. Thus, one can now increase the speed of rotation of the tool and tube while further advancing the same more rapidly while assuring that the entire clamped honeycomb structure will remain in proper alignment in the fixture during the boring operation.

It is understood that the above described dimensions are typical and many other alternate dimensions can be employed depending on the material, size of the tube and so on. It is also noted that there are other configurations defining surface configurations for such spinning tools, which would be apparent to those skilled in the art, after reading this specification.

I claim:

1. A method of fabricating a heat exchanger comprising the steps of:
    (a) forming an expandable stack of bonded foil sheets, each having a coaxial aperture of a relatively circular configuration,
    (b) expanding said stack to form a honeycomb member of a predetermined length, with said apertures aligned to provide a channel through said expanded member, said apertures in said expanded stack deformed into a relatively elliptical configuration,
    (c) joining a spin tool to a circular tube of a length selected by said predetermined length,
    (d) rotatably advancing said spin tool and said tube through said elliptical aperture to cause said tool to burnish and bore said aperture to form a circular aperture having a random peripheral edge pattern about said aperture to cause said tube as joined with said tool to firmly coact said honeycomb member.

2. The method according to claim 1 wherein said step of advancing a tube through said colinear apertures includes rotating a spin tool through said channel, said spin tool having a first section of a given diameter and a second section of a tapering diameter with said smallest diameter closest to said first section and said tube coupled to said tapered section at said end furthest removed from said first section, whereby said tool and tube are advanced through said channel.

3. The method according to claim 2 including the step of removing said tool from said tube when said tube is positioned within said channel.

4. A method of making a heat exchanger, comprising the steps of:
    (a) forming a foil stack having predetermined areas bonded and including an aperture through said stack,
    (b) expanding said stack along a mandril to provide an elongated honeycomb structure with said aperture extending along said expanded length,
    (c) clamping a spin tool to a tube to be inserted in said aperture,
    (d) rotating said clamped structure,
    (e) advancing said clamped structure through said aperture with said tool entering said aperture first to position said tube within said aperture in thermal contact with said honeycomb to cause said tool as rotated to burnish and bore said aperture while advancing, and (f) removing said tool from said tube when said tube is positioned within said aperture.

5. The method according to claim 4 further including the steps of:
   (a) clamping said elongated honeycomb structure in a relatively fixed position to restrain movement of the same prior to advancing said clamped structure through said aperture.

6. The method according to claim 4 wherein said foil is fabricated from a metallic sheet between 0.003 and 0.005 inches thick.

7. A method of fabricating a heat exchanger comprising the steps of:
   (a) forming a foil stack having predetermined areas bonded and including a relatively circular aperture through said stack,
   (b) expanding said stack along a mandril to provide an elongated honeycomb structure with said circular aperture extending along said expanded length and deformed into a relatively elliptical aperture due to said expansion with a vertical axis diameter relatively equal to said diameter of said circular aperture and a smaller horizontal diameter,
   (c) clamping a spin tool to a tube to be inserted into said aperture, said spin tool having a pilot section of a diameter slightly larger than said horizontal diameter, but less than said vertical diameter, and a tapered section coupled to said pilot section having located on the surface of said tapered section cutting members, said tube clamped to said tool at one end of said tapered section,
   (d) rotating and advancing said clamped structure through said aperture with said pilot section of said tool entering said aperture first to cause said cutting members to bore and burnish said aperture to form a circular aperture characterized by a peripheral edge of a random pattern to cause said tube, as clamped to said tool to be firmly coupled to said honeycomb about said aperture, and
   (e) removing said tool from said tube when said tube is positioned in said aperture.

8. The method according to claim 1 wherein said pilot portion of said tool is relatively smooth.

9. A method of fabricating a heat exchanger comprising the steps of:
   (a) forming an expandable stack of bonded foil sheets, each having a coaxial aperture of a relatively circular configuration,
   (b) expanding said stack to form a honeycomb member of a predetermined length, with said apertures aligned to provide a channel through said expanded member, said apertures in said expanded stack deformed into a relatively elliptical configuration,
   (c) joining said spin tool to a circular tube of a length selected by said predetermined length, said spin tool having a front smooth pilot section of a diameter approximately equal to the diameter of said coaxial apertures prior to expansion, a first sharp threaded section followed by a relatively smooth transistion section followed by a second threaded section having a flat threaded arrangement and of the same pitch as said first section, said flat threaded arrangement being defined by a diameter smaller than the diameter of said first sharp threaded section,
   (d) rotatably advancing said spin tool and said tube through said elliptical aperture to cause said tool to bore through said aperture to form a circular aperture, while forming a threaded portion about said tube as coupled to said honeycomb, said spin tool serving to flatten the edges of the foil aperture as it is rotated to cause said tube to firmly coact with said honeycomb member.

10. A method of fabricating a heat exchanger comprising the steps of:
    (a) forming a foil stack having predetermined areas bonded and including an aperture through said stack,
    (b) machining a longitudinal opened slot along one side of said stack, which slot is parallel with the main axis of said aperture,
    (c) placing said slot along a guide rail,
    (d) expanding said stack while using said slot and guide rail to provide an elongated honeycomb structure with said aperture extending along said expanded length as determined by said slot and said guide rail,
    (e) clamping a spin tool to a tube to be inserted in said aperture, said spin tool having a front smooth pilot section of a diameter approximately equal to the diameter of said coaxial apertures prior to expansion, a first sharp threaded section followed by a relatively smooth transistion section followed by a second threaded section having a flat threaded arrangement and of the same pitch as said first section, said flat threaded arrangement being defined by a diameter smaller than the diameter of said first sharp threaded section,
    (f) rotating and advancing said clamped structure through said aperture with said tool and therefore said tube entering said aperture to position said tube within said aperture, and
    (g) removing said tool from said tube when said tube is positioned within said aperture.

11. A method of fabricating a heat exchanger, comprising the steps of:
    (a) forming an expandable stack of bonded foil sheets, each having a coaxial aperture of a relatively circular configuration,
    (b) forming an opened slot along one side of said stack with said slot being relatively parallel to the axis of said aperture,
    (c) placing said slot in said stack over a guide channel having a given length,
    (d) expanding said stack with said slot guided by said channel to form a honeycomb member of a predetermined length with said aperture in said expanded honeycomb aligned according to said guide and slot and deformed into a relatively elliptical configuration,
    (e) joining said spin tool to a tube of a length selected according to said predetermined length, said spin tool having a front smooth pilot section of a diameter approximately equal to the diameter of said coaxial apertures prior to expansion, a first sharp threaded section followed by a relatively smooth transistion section followed by a second threaded section having a flat threaded arrangement and of the same pitch as said first section, said flat threaded arrangement being defined by a diameter smaller than the diameter of said first sharp threaded section, and (f) rotatably advancing said spin tool and said tube through said elliptical aperture to cause said tube to firmly coact with said honeycomb member by serving to flatten the edges of the foil aperture as said tool is rotated through said elliptical aperture.

12. The method according to claim 1 comprising the further steps of:

(a) forming a slot along one side of said stack prior to expansion of the same, which slot is relatively parallel to the main axis of said coaxial apertures, (b) guiding said stack during expansion by placing said slot over a guide channel to align said apertures relatively coaxial as determined by said slot and guide.

13. The method according to claim 12 wherein said spin tool further operates while rotating to form a threaded portion about said honeycomb and said tube as coupled thereto.

* * * * *